US011935392B2

(12) United States Patent
Bornstein

(10) Patent No.: US 11,935,392 B2
(45) Date of Patent: Mar. 19, 2024

(54) PREMISES SECURITY SYSTEM TESTING USING A PET IMITATION DEVICE

(71) Applicant: The ADT Security Corporation, Boca Raton, FL (US)

(72) Inventor: Jeron E. Bornstein, Delray Beach, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 17/961,969

(22) Filed: Oct. 7, 2022

(65) Prior Publication Data

US 2023/0215267 A1 Jul. 6, 2023

Related U.S. Application Data

(60) Provisional application No. 63/295,228, filed on Dec. 30, 2021.

(51) Int. Cl.
*G08B 29/14* (2006.01)
*G08B 25/00* (2006.01)

(52) U.S. Cl.
CPC ............. *G08B 29/14* (2013.01); *G08B 25/00* (2013.01)

(58) Field of Classification Search
CPC . G05D 1/0094; H04L 67/025; H04L 12/2809; G08B 17/06; G08B 25/009
See application file for complete search history.

(56) References Cited

U.S. PATENT DOCUMENTS

| | | | | |
|---|---|---|---|---|
| 7,075,431 | B2 | 7/2006 | Buckley et al. | |
| 7,400,242 | B2 | 7/2008 | Martin | |
| 10,071,475 | B2 | 9/2018 | Lin et al. | |
| 10,198,922 | B2 | 2/2019 | Beagley et al. | |
| 10,650,668 | B2 | 5/2020 | Sayavong et al. | |
| 2013/0278422 | A1 | 10/2013 | Friedman | |
| 2016/0210832 | A1* | 7/2016 | Williams | H04L 67/306 |
| 2018/0047230 | A1* | 2/2018 | Nye | G07C 9/37 |
| 2018/0247508 | A1* | 8/2018 | Friar | H04W 12/08 |
| 2021/0005075 | A1* | 1/2021 | Breed | H04L 67/306 |
| 2021/0069893 | A1 | 3/2021 | Hayashi et al. | |
| 2021/0097837 | A1* | 4/2021 | Saldin | G08B 17/06 |
| 2022/0173934 | A1* | 6/2022 | Decenzo | G05D 1/0094 |

* cited by examiner

*Primary Examiner* — Mirza F Alam
(74) *Attorney, Agent, or Firm* — Christopher & Weisberg, P.A.

(57) ABSTRACT

According to one or more embodiments, a mobile testing device for testing at least one premises device in a premises security system is provided. The mobile testing device includes processing circuitry configured to imitate a plurality of characteristics of a predefined animal and cause the mobile testing device to traverse at least a portion of a premises monitored by the premises security system while imitating the plurality of characteristics of the predefined animal.

20 Claims, 7 Drawing Sheets

PREMISES SECURITY SYSTEM TESTING USING A PET IMITATION DEVICE

CROSS-REFERENCE TO RELATED PATENT APPLICATION

This application is related to and claims priority to U.S. Provisional Patent Application Ser. No. 63/295,228, filed Dec. 30, 2021, entitled PREMISES SECURITY SYSTEM TESTING USING A PET IMITATION DEVICE, the entirety of which is incorporated herein by reference.

TECHNICAL FIELD

This disclosure relates to a method and premises security system, and in particular to a mobile device for testing a premises security system.

BACKGROUND

Existing premises security systems monitor a premises for predefined events typically associated with one or more specialized sensors. For example, a premises security system may trigger an intrusion alarm when a door contact sensor is triggered. However, some of these existing premises security systems suffer from false alarms triggered by one or more pets at the premises. For example, when the premises security system is armed, a cat may be detected by a motion sensor and/or infrared sensor, thereby triggering a false alarm at the premises security system alarm.

In order to help reduce false alarms, some existing premises security systems and devices are tested using a person that traverses the premises where sensors can be adjusted based on the detected/undetected person. However, such testing of a premises security system is inaccurate as a person is typically associated with a larger cross-section and heat signature than a typical pet (e.g., cat, dog, etc.). Other testing arrangements rely on a person pulling a bucket of water (e.g., warm water) tied to a string through a simulated premises to simulate the movement and thermal radiation of a pet. Such a method is messy, time consuming and may not be accurate as this simulation arrangement allows only linear movement via the string pull and a limited thermal radiation profile. Hence, existing methods for testing a premises security system suffer from various inaccuracies that may (1) hinder the suppression of false alarms and/or (2) hinder actual alarms due to inaccurately tested and configured sensors.

SUMMARY

Some embodiments advantageously provide a method and system for premises security system testing using a pet imitation device. In one or more embodiments, one or more parameters of one or more sensors may be automatically configured/reconfigured/modified based on one or more "runs" of the pet imitation device through at least a portion of the premises monitored by the premises security device.

According to another aspect of the invention, an imitation device (e.g., mobile pet simulation testing device) for testing a premises security system is provided. The imitation device is configured to imitate a plurality of characteristics of a predefined animal, and to traverse at least one portion of a premises monitored by the premises security system while imitating the plurality of characteristics of the predefined animal for the testing of the at least one premises device in the premises security system, as described herein.

According to one or more embodiments of this aspect, the plurality of characteristics includes at least one of a predefined thermal profile, a predefined linear acceleration profile, a predefined linear minimum velocity, a predefined linear maximum velocity, a predefined rotational acceleration profile, a predefined minimum rotational velocity, a predefined maximum rotational velocity, a predefined cross-sectional area, a predefined height, a predefined sound, a predefined amount of heat generation, or a predefined thermal profile along the predefined cross-sectional area. According to one or more embodiments of this aspect, the imitation device further includes a battery and battery circuitry that are configured to power at least one heating element for imitating a thermal profile of the predefined animal, where the thermal profile is one of the plurality of characteristics, and where the battery circuitry is configured to distribute power to the at least one heating element for a duration of the traversing. According to one or more embodiments of this aspect, imitating the plurality of characteristics includes deploying at least one expandable element to increase a cross-sectional area in a predefined manner, where the cross-sectional area is one of the plurality of characteristics. According to one or more embodiments of this aspect, the imitation device includes at least one sensor configured to track a predefined path in the premises to enable the device to traverse a predefined path through at least part of the premises. According to one or more embodiments of this aspect, the imitation device includes at least one sensor configured to track a predefined path in the premises to enable the mobile testing device to recognize a non-predefined path when the mobile testing device has lost the track According to one or more embodiments of this aspect, imitation device is configured to cause the device to traverse randomly through at least part of the premises. According to one or more embodiments of this aspect, imitation device includes a preconfigured cap that is removably attachable to the mobile testing device, where the cap is sized to emulate the predefined animal. The cap includes one or more heating elements to generate a thermal profile of the predefined animal. According to one or more embodiments of this aspect, imitation device is further configured to dynamically modify at least one of the plurality of characteristics of a predefined animal while testing of the at least one premises device in the premises security system.

According to another aspect of the invention, a method implemented by an imitation device (e.g., mobile pet simulation testing device) for testing a premises security system is provided. The method includes imitating a plurality of characteristics of a predefined animal, and traversing at least one portion of a premises monitored by the premises security system while imitating the plurality of characteristics of the predefined animal for the testing of the at least one premises device in the premises security system, as described herein.

According to one or more embodiments of this aspect, the plurality of characteristics includes at least one of a predefined thermal profile, a predefined linear acceleration profile, a predefined linear minimum velocity, a predefined linear maximum velocity, a predefined rotational acceleration profile, a predefined minimum rotational velocity, a predefined maximum rotational velocity, a predefined cross-sectional area, a predefined height, a predefined sound, a predefined amount of heat generation, or a predefined thermal profile along the predefined cross-sectional area. According to one or more embodiments of this aspect, power is provided to heating element(s) of the imitation device for imitating a thermal profile of the predefined animal, where the thermal profile is one of the plurality of characteristics, and power is distributed to the heating element(s) for a duration of the traversing. According to one or more embodiments of this aspect, imitating the plurality of characteristics includes deploying at least one expandable element to increase a cross-sectional area in a predefined manner, where the cross-sectional area is one of the plurality of characteristics. According to one or more embodiments of this aspect, a predefined path is tracked in the premises to enable the imitation device to traverse a predefined path through at least part of the premises. According to one or more embodiments of this aspect, the traversal is randomized through at least part of the premises. According to one or more embodiments of this aspect, a thermal profile of the predefined animal is generated using heating elements of a preconfigured cap that is removably attachable to the mobile testing device, where the cap is sized to emulate the predefined animal, and the cap includes a plurality of heating elements. According to one or more embodiments of this aspect, at least one of the plurality of characteristics of a predefined animal is dynamically modified while testing of the at least one premises device in the premises security system.

According to another aspect of the invention, a non-transitory, computer-readable storage medium is provided which includes instructions which, when executed, cause an imitation device/mobile testing device to imitate a plurality of characteristics of a predefined animal, and to cause the imitation device traverse at least one portion of a premises monitored by the premises security system while imitating the plurality of characteristics of the predefined animal for the testing of the at least one premises device in the premises security system, as described herein.

According to one or more embodiments of this aspect, the plurality of characteristics includes at least one of a predefined thermal profile, a predefined linear acceleration profile, a predefined linear minimum velocity, a predefined linear maximum velocity, a predefined rotational acceleration profile, a predefined minimum rotational velocity, a predefined maximum rotational velocity, a predefined cross-sectional area, a predefined height, a predefined sound, a predefined amount of heat generation, or a predefined thermal profile along the predefined cross-sectional area.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
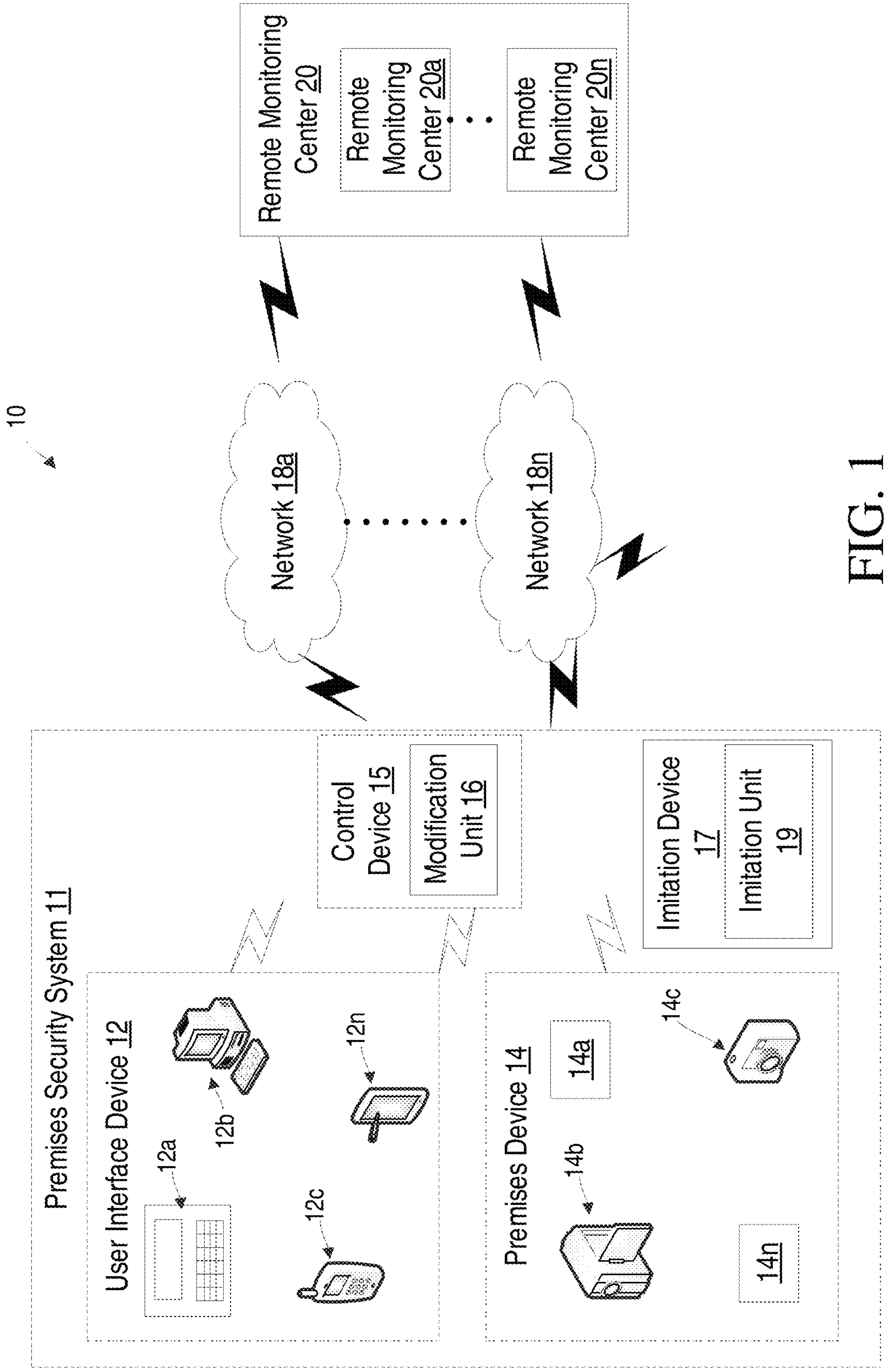
FIG. 1 is a diagram of an example system comprising a premises security system according to principles disclosed herein.

Before describing in detail exemplary embodiments, it is noted that the embodiments reside primarily in combinations of apparatus components and processing steps related to premises security system testing using a mobile device, i.e., imitation device. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 a system designated generally as "10." System 10 may include premises security system 11 where premises security system 11 includes and/or is associated with one or more user interface devices 12*a* to 12*n* (collectively referred to as "user interface device 12"), one or more premises devices 14*a* to 14*n* (collectively referred to as "premises device 14"), and control device 15. System 10 may further include one or more networks 18*a* to 18*n* (collectively referred to as "network 18"), and one or more remote monitoring centers 20*a* to 20*n* (collectively referred to as "remote monitoring center 20"), communicating with each other or with at least one other entity in system 10.

User interface device 12 may be a wireless device that allows a user to communicate with control device 15. User interface device 12 may be a portable control keypad/interface 12*a*, computer 12*b*, mobile phone 12*c* and tablet 12*n*, among other devices that allow a user to interface with control device 15 and/or one or more premises devices 14. User interface device 12 may communicate at least with control device 15 using one or more wired and/or wireless communication protocols well known to those of ordinary skill in the art. For example, portable control keypad 12*a* may communicate with control device 15 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 12.

Premises devices 14 may include one or more types of sensors, control and/or image capture devices. For example, the types of sensors may include various safety related sensors such as motion sensors, infrared sensors, fire sensors, heat sensors, carbon monoxide sensors, flooding sensors and contact sensors, among other sensor types that are known in the art. The premises devices 14 may include, for example, one or more life style (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with control device 15 via proprietary wireless communication protocols and may also use Wi-Fi, both of which are known in the art. Other communication technologies can also be used, and the use of Wi-Fi is merely, for example. Those of ordinary skill in the art will also appreciate that various additional sensors and control and/or image capture devices may relate to life safety or life style depending on both what the sensors, control and image capture devices do and how these sensors, control and image devices are used by system 10.

Control device 15 may provide one or more of management functions and monitoring functions, analysis functions, control functions such as power management, premises device management and alarm management/analysis, among other functions to premises security system 11. In particular, control device 15 may manage one or more life safety and life style features. Life safety features may correspond to security system functions and settings associated with premises conditions that may result in life threatening harm to a person such as carbon monoxide detection and intrusion detection. Life style features may correspond to security system functions and settings associated with video capturing devices and non-life-threatening conditions of the premises such as lighting and thermostat functions. In one or more embodiments, control device 15 such as modification unit 16 may be configured to modify/configure/reconfigure at least one setting of one or more premises devices 14 such as based on one or more iterations of the testing process described herein.

Control device 15 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links known in the art. Broadband as used herein may refer to a communication link other than a plain old telephone service (POTS) line. Ethernet communication link may be an IEEE 802.3 or 802.11 based communication link. Network 18 may be a wide area network, local area network, wireless local network and metropolitan area network, among other networks known in the art. Network 18 provides communications between control device 15 and remote monitoring center 20. In one or more embodiments, control device 15 may be part of premises device 14 or user interface device 12.

While control device 15 is illustrated as being a separate device from user interface device 12 and premises device 14, in one or more embodiments, control device 15 may be integrated with one or more user interface devices 12 and/or premises devices 14 and/or other entity/device located at premises associated with premises security system 11.

Premises security system 11 includes imitation device 17 that is configured to implement one or more pet-like behaviors and/or characteristics for premises security system testing and/or false alarm detection. In one or more embodiments, the pet-like behavior/characteristic may include speed at which imitation device 17 moves throughout the premises such that the imitation device 17 is able to move at one or more predefined speeds associated with a specific animal/pet. In one or more embodiments, imitation device 17 is mobile such that imitation device 17 may include one or more mechanisms for moving around the premises, such as motorized wheels, tracks, etc. In one or more embodiments, pet-like characteristics may include generating a predefined amount of heat such that the heat emitted by imitation device 17 corresponds to heat/thermal energy emitted by a specific type of pet. In one or more embodiments, imitation device 17 such as via imitation unit 19 may be configured to implement one or more pet-like behaviors/characteristics based on one or more predefined settings, as described herein. For example, a "cat" setting may be implemented by imitation device 17 such that one or more of: a predefined amount of heat/thermal energy is generated/emitted by imitation device, imitation device 17 moves at a predefined speed, imitation device 17 modifies its cross-sectional area to a predefined amount (i.e., to an amount comparable to a cat), etc. For example, imitation device 17 may implement one or more mechanical changes that cause the cross-sectional area of imitation device 17 to increase or decrease. In one embodiment, the mechanical change may relate to deploying one or more expandable elements/mechanisms, such as a telescoping structure, an expandable basket/cage/mesh/etc. structure, an inflatable structure (e.g., balloon), etc., to increase a cross-sectional area in a predefined manner in line with the cross-sectional area of the predefined animal, e.g., dog, cat, etc. In one or more embodiments, one or more expandable elements include one or more heat elements, such as an infra-red heating element, heat generated from one or more batteries, e.g., from discharging electricity during operation, a thermal resistance heating element, heating coils, heating plates, etc.

Example implementations, in accordance with one or more embodiments, of control device 15 and imitation device 17 discussed in the preceding paragraphs will now be described with reference to FIGS. 2 and 3.

Figure 2:
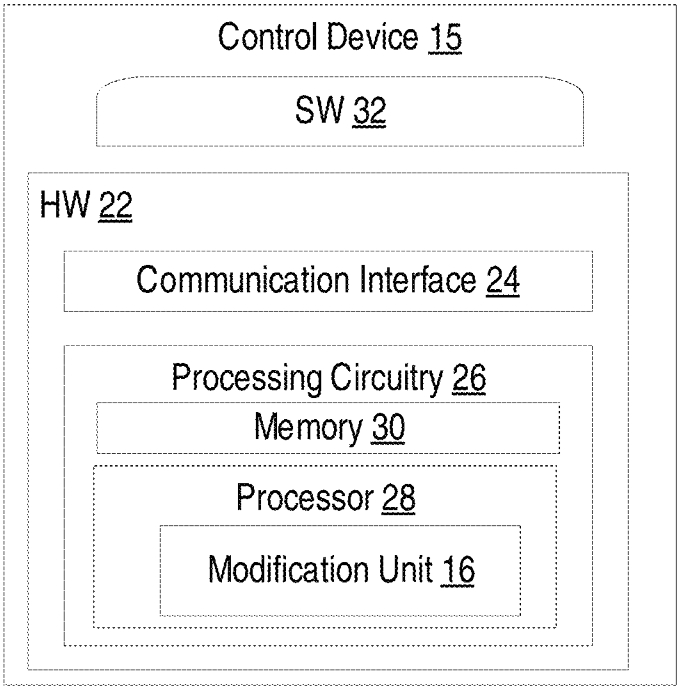
FIG. 2 is a block diagram of a control device according to some embodiments of the present disclosure.

With respect to FIG. 2, the system 10 includes a control device 15 that includes hardware 22 enabling the control device 15 to communicate with one or more entities in system 10 and to perform one or more functions described herein. The hardware 22 may include a communication interface 24 for setting up and maintaining at least a wired and/or wireless connection to one or more entities in system

10 such as remote monitoring center 20, premises device 14, user interface device 12, optionally imitation device 17, etc.

In the embodiment shown, the hardware 22 of the control device 15 further includes processing circuitry 26. The processing circuitry 26 may include a processor 28 and a memory 30. In particular, in addition to or instead of a processor, such as a central processing unit, and memory, the processing circuitry 26 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the control device 15 further has software 32 stored internally in, for example, memory 30, or stored in external memory (e.g., database, storage array, network storage device, etc.) accessible by the control device 15 via an external connection. The software 32 may be executable by the processing circuitry 26. The processing circuitry 26 may be configured to control any of the methods and/or processes described herein and/or to cause such methods, and/or processes to be performed, e.g., by control device 15. Processor 28 corresponds to one or more processors 28 for performing control device 15 functions described herein. The memory 30 is configured to store data, programmatic software code and/or other information described herein. In some embodiments, the software 32 may include instructions that, when executed by the processor 28 and/or processing circuitry 26, causes the processor 28 and/or processing circuitry 26 to perform the processes described herein with respect to control device 15. For example, processing circuitry 26 of the control device 15 may include modification unit 16 which is configured to perform one or more control device 15 functions described herein such as with respect to modification and/or reconfiguration of one or more premises devices 14.

Figure 3:
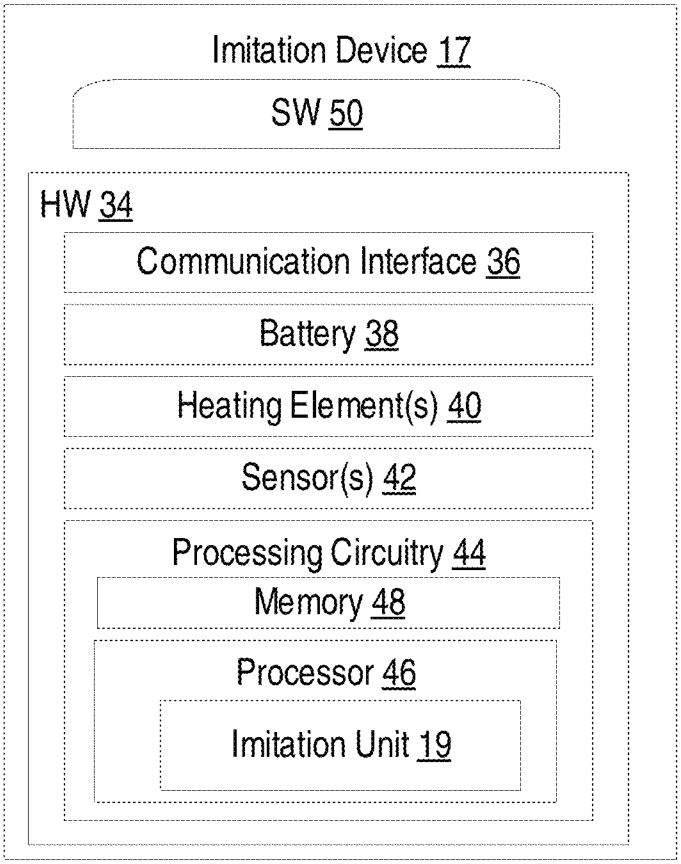
FIG. 3 is a block diagram of an imitation device according to some embodiments of the present disclosure.

With respect to FIG. 3, the system 10 includes an imitation device 17 that includes hardware 34 enabling the imitation device 17 to communicate with one or more entities in system 10 and to perform one or more functions described herein. The hardware 34 may optionally include a communication interface 36 for setting up and maintaining at least a wired and/or wireless connection to one or more entities in system 10 such as premises device 14, user interface device 12, control device 15, etc. Further, hardware 34 may include at least one steerable wheel (not shown) driven by at least one motor (not shown) to cause movement of imitation device 17 such as along a path as described herein.

In the embodiment shown, the hardware 34 of the imitation device 17 further includes one or more batteries 38 (collectively referred to as battery 38) that is configured to power one or more heating elements 40 (collectively referred to as heating element 40), and optionally one or more other circuits or elements of imitation device 17. Battery 38 may be associated with a battery circuit/circuitry (not shown) that is configured to provide power to heating element 40 to allow heating element 40 to emit a predefined amount of heat for at least a predefined amount of time to emulate an animal. Heating element 40 is configured to generate various quantities of heat as controlled by processing circuitry 44. For example, processing circuitry 44 may cause heating element 40 to generate a first predefined amount of heat corresponding to the temperature of a cat. For example, if imitation device 17 is emulating a cat (i.e., placed in cat mode), imitation device 17 may be configured to move at speed X1 and heating element 40 may be configured to heat an exterior of imitation device 17 to Y1 degrees or to provide heating profile Z1 for the stored cat profile.

An example configuration for battery 38 and battery circuitry (e.g., part of processing circuitry 44 configured to control battery related functions such as controlling power to heating element 40) may be as follows. Battery 38 provides power to heating element 40 via an optocoupled high-side MOSFET switch current regulator (e.g., part of battery circuitry) where the current regulator is then controlled via a low-side MOSFET pulse width modulation signal as part of processing circuitry 44. Additionally, in one or more embodiments, a diode (e.g., part of battery circuitry) is used to one or more of limit over-voltage conditions and help filter out noise. Therefore, imitation device 17 is able to power heating element 40 without damaging battery 38 for performing one or more functions of imitation device 17 as described herein.

In another example, processing circuitry 44 may cause heating element 40 to generate a second predefined amount of heat that may correspond to the temperature of a dog. That is, if imitation device 17 is place into dog mode to emulate a dog, imitation device 17 may be configured to move a speed X2 and heating element 40 may be configured to heat an exterior of imitation device 17 to Y2 degrees or to provide heating profile Z2 for the stored dog profile. Other predefined or preconfigured modes may also be configured where each mode controls at least one predefined characteristic (e.g., speed, heat, size, etc.) of the emulation. Also, processing circuitry 44 may be configured to implement a specific heat profile such that heat is generated according to a specific heat distribution across at least a portion of the imitation device 17.

In one or more embodiments, a preconfigured cap may be removably attachable to imitation device 17 where the preconfigured cap (with embedded heating element(s) 40 that are powered from disconnectable electrical connections) is cat sized and coupled to imitation device 17 (e.g., removably coupled to motor, processing circuitry 44, portion of imitation device 17, etc.). In another embodiment, the preconfigured cap is dog sized where the cap includes embedded heating element(s) 40 that are powered from a disconnectable electrical connection. Therefore, different preconfigured caps may be removably attached to imitation device 17 depending on which animal is being emulated such that the cap is sized to emulate the size of the animal for testing with the sensor, and such that the cap can be heated via embedded or applied heating elements to the corresponding normal temperature of the animal being emulated.

It is also contemplated that the cap (or portion of the imitation device 17 that includes the motors and processing circuitry 44 can include embedded or applied sound transducers, e.g., speakers, to play a sound corresponding to the animal being emulated at a volume representative of the animal. This allows for the testing of sound-based sensors, e.g., voice, glass break, etc. In such cases, the processing circuitry 44 can be configured to cause the sound transducer (not shown) to play the sound corresponding to the profile of the animal being emulated, e.g., sound profile of the dog. For sound enabled imitation devices 17, it is contemplated that that imitation devices 17 may include an amplifier and digital to analog converter to allow the playback of the stored animal sound.

Imitation device 17 may include one or more sensors 42 such as motion sensors, distance sensors, imaging sensors, infrared sensors, etc. At least one of sensors 42 may be configured to at least in part direct/steer imitation device 17 through at least a portion of the premises. For example, distance proximity sensors may be used to indicate that imitation device 17 is approaching a wall, whereas imaging sensor(s) may be used to cause imitation device 17 to move along a predefined path along the premises floor indicating the path the imitation device 17 should follow. The predefined path may be indicated by reflective tape or a predefined color line, where the processing circuitry 44 receives tracking data from at least one sensor 42 and adjusts the movement to follow the predefined part, etc.

In one or more embodiments, sensors 42 may be used to detect one or more premises device 14 such that imitation device 17 can determine that it is approaching a premises device 14, which may trigger one or more actions for testing the premises security system.

Imitation device 17 includes processing circuitry 44. The processing circuitry 44 may include a processor 46 and a memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the imitation device 17 further has software 50 stored internally in, for example, memory 48, or stored in external memory (e.g., database, storage array, network storage device, etc.) accessible by the imitation device 17 via an external connection. The software 50 may be executable by the processing circuitry 44. The processing circuitry 44 may be configured to control any of the methods and/or processes described herein and/or to cause such methods, and/or processes to be performed, e.g., by imitation device 17. Processor 46 corresponds to one or more processors 46 for performing imitation device 17 functions described herein. The memory 48 is configured to store data, programmatic software code and/or other information described herein. In some embodiments, the software 50 may include instructions that, when executed by the processor 46 and/or processing circuitry 44, causes the processor 46 and/or processing circuitry 44 to perform the processes described herein with respect to imitation device 17. For example, processing circuitry 44 of the imitation device 17 may include imitation unit 19, which is configured to perform one or more imitation device 17 functions as described herein such as with respect to testing a premises security system such as by imitating one or more characteristics of a predefined animal, mammal, etc.

Although FIGS. 1-3 show imitation unit 19 and modification unit 16 as being within a respective processor, it is contemplated that this unit may be implemented such that a portion of the unit is stored in a corresponding memory within the processing circuitry. In other words, the unit may be implemented in hardware or in a combination of hardware and software within the processing circuitry.

Figure 4:
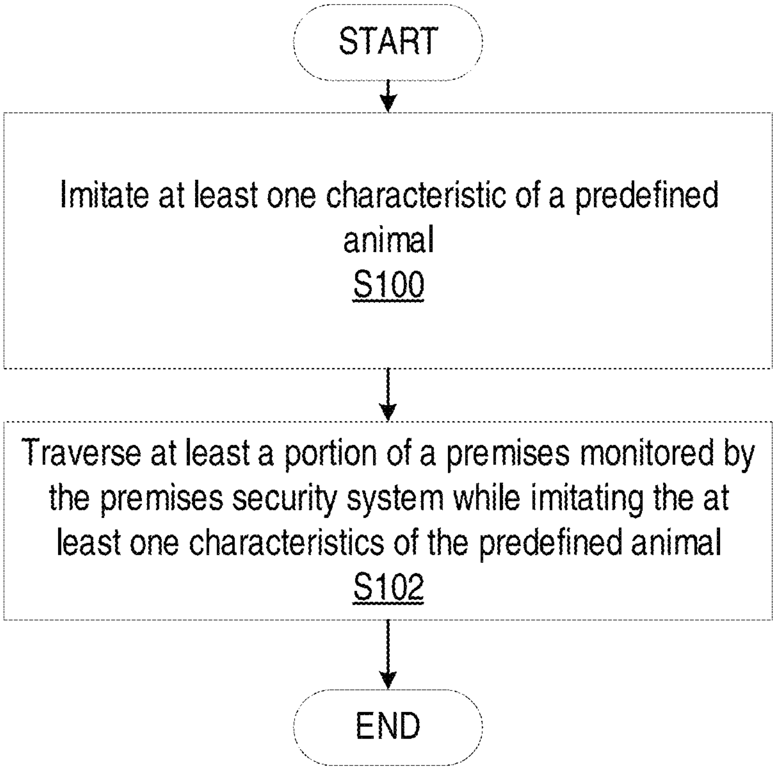
FIG. 4 is a flowchart of an example process in the imitation device according to some embodiments of the present disclosure.

FIG. 4 is a flowchart of an example process in an imitation device 17 (e.g., mobile pet simulation testing device) according to one or more embodiments of the present invention. One or more blocks described herein may be performed by one or more elements of imitation device 17 such as by one or more of processing circuitry 44 (including the imitation unit 19), processor 46, etc. Imitation device 17 is configured to imitate (Block S100) at least one characteristic of a predefined animal, as described herein. Imitation device 17 is configured to traverse (Block S102) at least a portion of a premises monitored by the premises security system 11 while imitating the at least one characteristic of the predefined animal, as described herein.

According to one or more embodiments, the at least one characteristic includes at least one of a predefined thermal profile, a predefined mobile speed, a predefined cross-sectional area, a predefined height, a predefined amount of heat generation, and a predefined thermal profile along the predefined cross-sectional area. According to one or more embodiments, imitation device 17 includes a battery 38 and battery circuitry that are configured to power a heating element 40 for imitating the at least one characteristic of the predefined animal where the battery circuitry is configured to distribute power to the heating element for a duration of the testing. According to one or more embodiments, the processing circuitry 44 is further configured to repeat the traversing of the at least a portion of the premises monitored by the premises security system 11 while imitating the at least one characteristic of the predefined animal for a predefined number of times during the testing.

According to one or more embodiments, at least one sensor 42 is configured to track a predefined path in the premises for testing. According to another embodiment, imitation device 17 is configured to move randomly throughout at least part of the premises by use of a randomizer for generating random movement commands. In this example, at least one sensor 42 is configured to keep imitation device 17 from running into obstacles by causing, for example, a change to another random direction when at least one sensor 42 senses an objection in the path of imitation device 17.

According to one or more embodiments, the processing circuitry 44 is further configured to indicate, to a control device 15 of the premises security system 11, the predefined animal in order to allow the control device 15 to reconfigure at least one premises device 14 based on the testing. According to one or more embodiments, imitation device 17 is equipped with at least one geotag where geotag data may be relayed to control device 15 and/or another device for testing and analysis purposes. The geotag data allows for premises testing data to be correlated with location data of the imitation device 17 for analysis such as to ascertain where and under what conditions there might be an issue with imitation device 17 and/or a premise device(s) 14.

Figure 5:
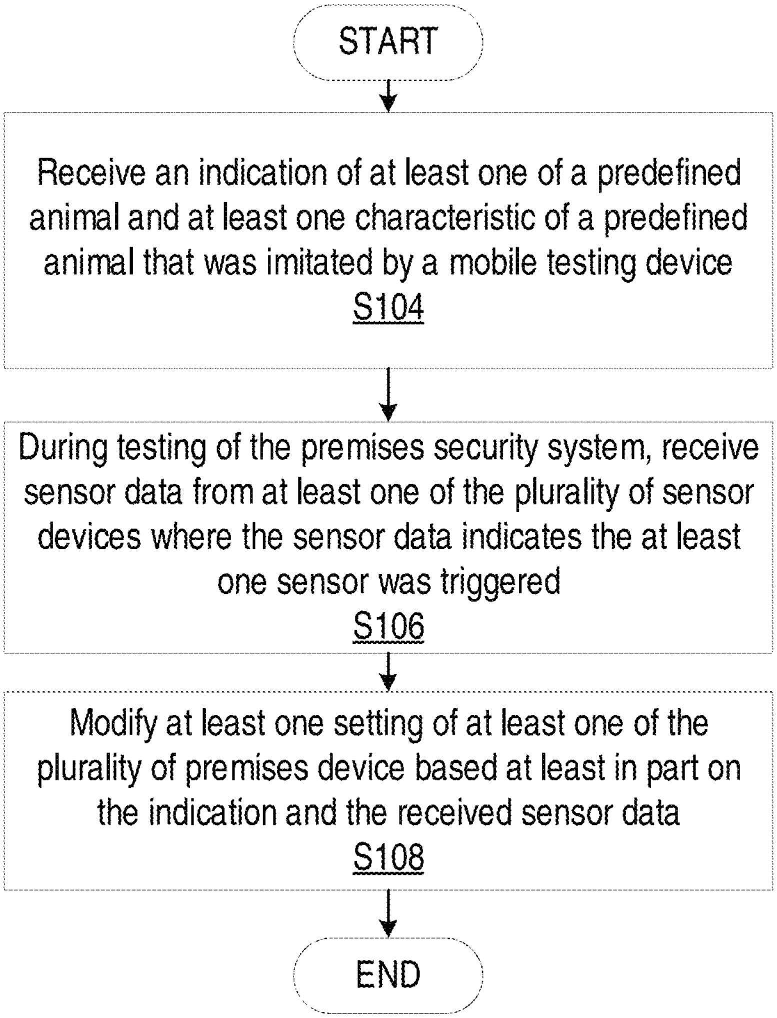
FIG. 5 is a flowchart of an example process in control device according to some embodiments of the present disclosure.

FIG. 5 is a flowchart of an example process in a control device 15 according to one or more embodiments of the present invention. One or more blocks described herein may be performed by one or more elements of control device 15 such as by one or more of processing circuitry 26 (including the modification unit 16), processor 28, etc. Control device 15 is configured to receive an indication of at least one of a predefined animal and at least one characteristic of a predefined animal that was imitated by a mobile testing device (i.e., imitation device 17). Control device 15 is configured to, during testing of the premises security system 11, receive sensor data from at least one of the plurality of premises devices 14 where the sensor data indicates the at least one sensor was triggered. Control device 15 is configured to modify at least one setting of at least one of the plurality of premises device 14 based at least in part on the indication and the received sensor data. According to one or more embodiments, the at least one setting includes at least one of a sensor sensitivity and direction of sensing.

Figure 6:
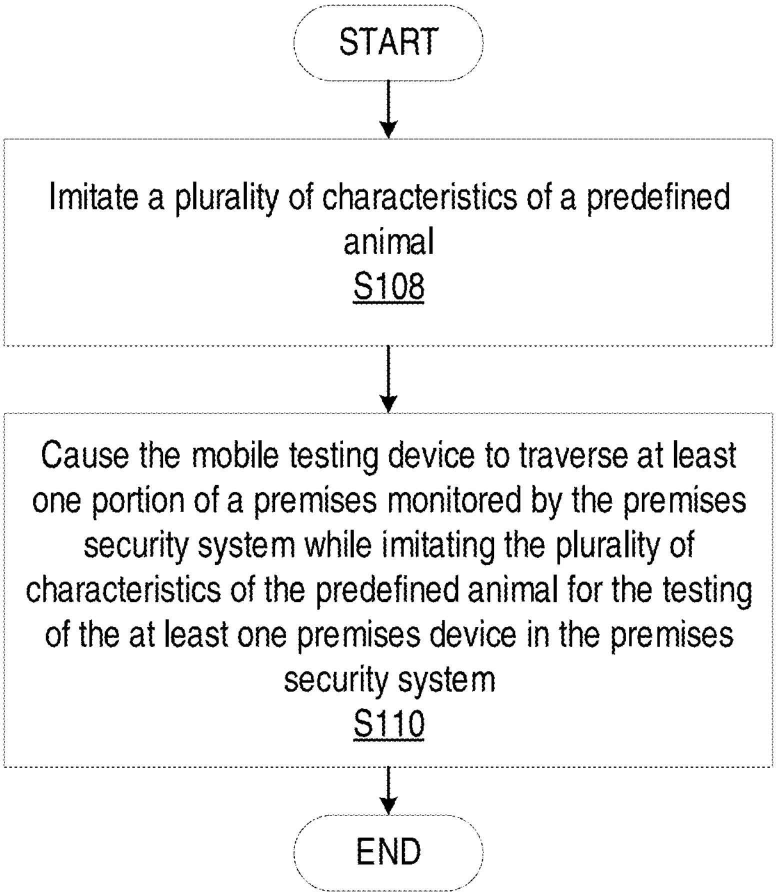
FIG. 6 is a flowchart of another example process in the imitation device according to some embodiments of the present disclosure.

FIG. 6 is a flowchart of another example process in an imitation device 17 (e.g., mobile pet simulation testing device) according to one or more embodiments of the present invention. One or more blocks described herein may be performed by one or more elements of imitation device 17 such as by one or more of processing circuitry 44 (including the imitation unit 19), processor 46, etc. Imitation device 17 is configured to imitate (Block S108) a plurality of characteristics of a predefined animal, as described herein. Imitation device 17 is configured to traverse (Block S110) at least one portion of a premises monitored by the premises security system 11 while imitating the plurality of characteristics of the predefined animal for the testing of the at least one premises device 14 in the premises security system 11, as described herein.

According to one or more embodiments, the plurality of characteristics includes at least one of a predefined thermal profile, a predefined linear acceleration profile, a predefined linear minimum velocity, a predefined linear maximum velocity, a predefined rotational acceleration profile, a predefined minimum rotational velocity, a predefined maximum rotational velocity, a predefined cross-sectional area, a predefined height, a predefined sound, a predefined amount of heat generation, or a predefined thermal profile along the predefined cross-sectional area. According to one or more embodiments, the imitation device 17 further includes a battery 38 and battery circuitry that are configured to power at least one heating element for imitating a thermal profile of the predefined animal, where the thermal profile is one of the plurality of characteristics, and the battery circuitry is configured to distribute power to the at least one heating element 40 for a duration of the traversing. According to one or more embodiments, the imitating of the plurality of characteristics includes deploying at least one expandable element to increase a cross-sectional area in a predefined manner, where the cross-sectional area is one of the plurality of characteristics. According to one or more embodiments, the imitation device 17 includes at least one sensor 42 configured to track a predefined path in the premises to enable the mobile testing device to traverse a predefined path through at least part of the premises. According to one or more embodiments, the imitation device 17 includes at least one sensor 42 configured to track a predefined path in the premises to enable the mobile testing device to recognize a non-predefined path when the mobile testing device has lost the track. According to one or more embodiments, processing circuitry 44 of the imitation device 17 is configured to cause the device to traverse randomly (e.g., by randomly varying one or more parameters, such as acceleration, velocity, etc.) through at least part of the premises. According to one or more embodiments, imitation device 17 includes a preconfigured cap that is removably attachable to the mobile testing device, where the cap is sized to emulate the predefined animal. The cap includes a plurality of heating elements to generate a thermal profile of the predefined animal. According to one or more embodiments, imitation device 17 is further configured to dynamically modify at least one of the plurality of characteristics of a predefined animal while testing of the at least one premises device in the premises security system 11.

In some embodiments, the plurality of characteristics includes a predefined linear acceleration profile, which may include, for example, one or more metrics defining/simulating/modeling a rate at which an animal typically accelerates/decelerates (e.g., the rate at which its velocity changes) while traversing a physical environment.

In some embodiments, the plurality of characteristics includes a predefined linear minimum velocity, which may include, for example, one or more metrics defining/simulating/modeling a minimum speed (e.g., a minimum rate of change of displacement) of an animal while the animal moves along a path (e.g., a straight path). The "minimum" may refer to a typical operational minimum speed, i.e., while moving, the simulated animal maintains (or attempts to maintain) at least the predefined linear minimum velocity, but while stopped, turning, reacting to a stimulus, and/or performing some other simulated action, the linear velocity may fall below the minimum.

In some embodiments, the plurality of characteristics includes a predefined linear maximum velocity, which may include, for example, one or more metrics defining/simulating/modeling a maximum speed (e.g., a maximum rate of change of displacement) of an animal while the animal moves along a path (e.g., a straight path). The "maximum" may refer to a typical operational maximum speed, i.e., while moving, the simulated animal maintains (or attempts to maintain) a linear velocity which is not greater than the predefined linear maximum velocity, but while stopped, turning, reacting to a stimulus, and/or performing some other simulated action, the linear velocity (temporarily) rise above the maximum.

In some embodiments, the plurality of characteristics includes a predefined rotational acceleration profile, which may include, for example, one or more metrics defining/simulating/modeling a rotational acceleration (e.g., rate of change of the rotational/angular velocity) of an animal, e.g., while the animal moves along a path, makes a turn, or performs some other simulated action.

In some embodiments, the plurality of characteristics includes a predefined minimum rotational velocity, which may include, for example, one or more metrics defining/simulating/modeling a minimum rotational acceleration (e.g., rate of change of the rotational/angular velocity) of an animal, e.g., while the animal moves along a path, makes a turn, or performs some other simulated action. The "minimum" may refer to a typical operational minimum rotational velocity, i.e., while turning, the simulated animal maintains (or attempts to maintain) at least the predefined minimum rotational velocity, but while stopped, moving in a straight line, reacting to a stimulus, and/or performing some other simulated action, the minimum rotational velocity may fall below the minimum.

In some embodiments, the plurality of characteristics includes a predefined maximum rotational velocity, which may include, for example, one or more metrics defining/simulating/modeling a maximum rotational acceleration (e.g., rate of change of the rotational/angular velocity) of an animal, e.g., while the animal moves along a path, makes a turn, or performs some other simulated action. The "maximum" may refer to a typical operational maximum rotational velocity, i.e., while turning, the simulated animal maintains (or attempts to maintain) a rotational velocity which is not greater the predefined maximum rotational velocity, but while stopped, moving in a straight line, reacting to a stimulus, and/or performing some other simulated action, the maximum rotational velocity be (temporarily) above the maximum.

In some embodiments, the imitation device 17 includes a battery 38 and/or battery circuitry that are configured to power at least one driving element/motor element/etc. for imitating a motion profile of the predefined animal. The driving element/motor element may be any suitable driving/motor device known in the art, such as a direct current motor, an alternating current motor, brushless motor, etc. The motion profile may be one of the plurality of characteristics. The battery 38 (battery circuitry) may distribute power to at least one driving element and/or motor element for at least part of the duration that the imitation device 17 traverses the premises.

In some embodiments, imitation device 17 includes one or more sensors for tracking a predefined path in the premises to enable the imitation device 17 to traverse a predefined path through at least part of the premises. In some embodiments, another sensor may be used to track a predefined path in the premises to enable the imitation device 17 to recognize a non-predefined path, such as when the imitation device 17 has lost the track.

Figure 7:
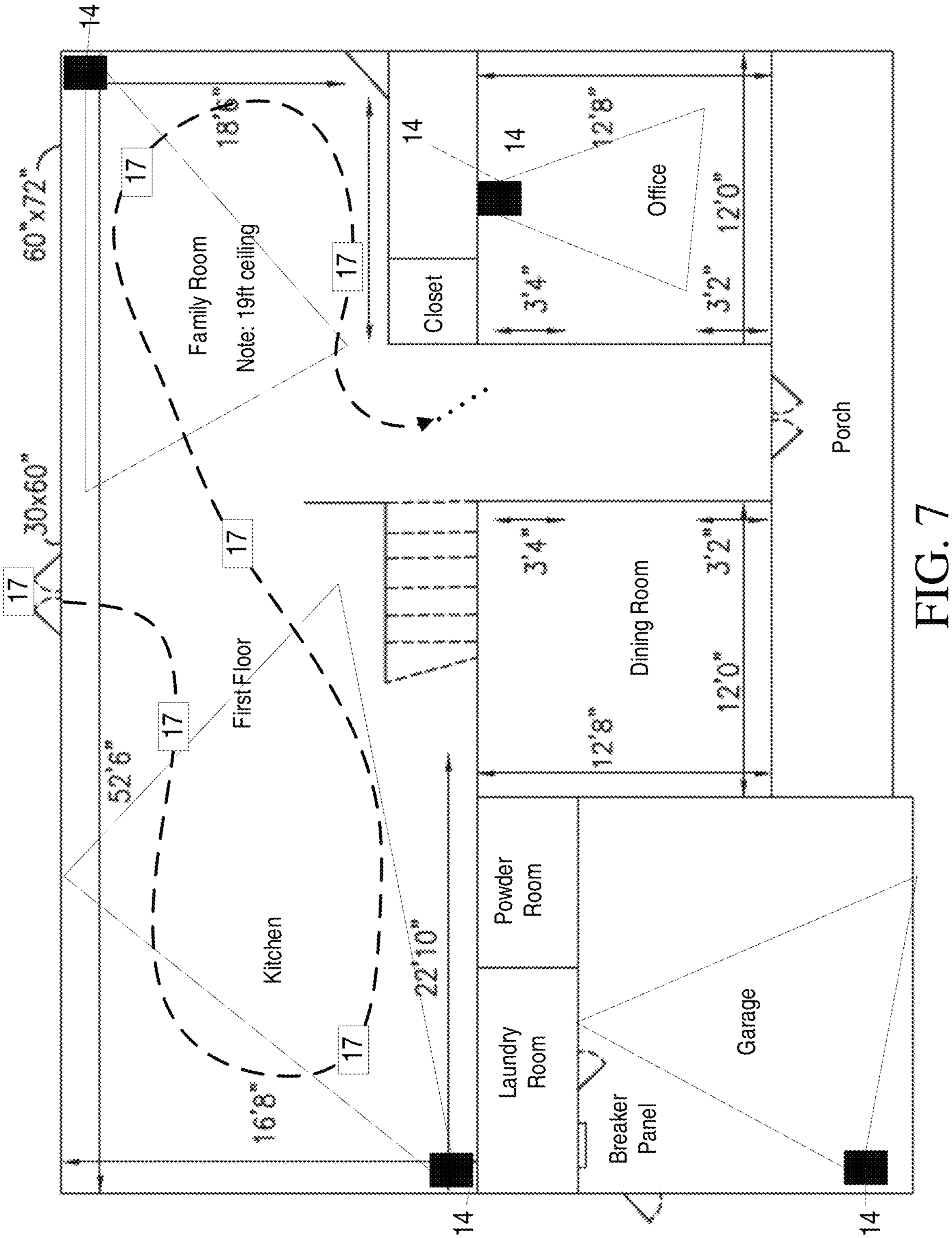
FIG. 7 is a diagram of an example testing layout for a premises security system.

FIG. 7 is an example diagram of a premises monitored by the premises security system 11. In particular, various premises devices 14 (e.g., motion and/or IR sensors) are positioned throughout the premises. Imitation device 17 is configured to implement at least one characteristic of a predefined animal and then traverses the premises while implementing the at least one characteristic, thereby allowing for testing of the premises security system 11 in an accurate and reproducible manner.

For example, imitation device 17 is set to dog mode where imitation device via one or more heating element 40, at least one steerable wheel, imitation unit 19, removably attachable cap, etc., is configured to emulate at least one characteristic of a dog. With the premises security system 11 armed, imitation device 17 begins to traverse the premises such as by going through front doors on the first floor and then to the kitchen. While only one premises device 14 is illustrated in the kitchen in FIG. 7, there may be one or more premises devices 14 (e.g., motion sensors, thermal sensors, etc.) in the kitchen such that imitation device 17 will test one or more of these premises devices 14. For example, if a motion sensor is not properly configured (e.g., not properly placed/positioned, sensitivity is too high/low, etc., then imitation device 17 may trigger the motion sensor, thereby alerting control device 15 and/or another testing device that the motion sensor is not property configured as premises security system 11, in one example, should not trigger an alarm for pet movement. Imitation device 17 may continue to traverse the premises according to a predefined path and/or randomized path, etc.

Some Examples:

Example A1. A mobile testing device for testing at least one premises device in a premises security system, the mobile testing device comprising:

- processing circuitry configured to:
  - imitate at least one characteristic of a predefined animal; and
  - traverse at least a portion of a premises monitored by the premises security system while imitating the at least one characteristic of the predefined animal.

Example A2. The mobile testing device of Example A1, wherein the at least one characteristic include at least one of a predefined thermal profile, a predefined mobile speed, a predefined cross-sectional area, a predefined height, a predefined amount of heat generation, and a predefined thermal profile along the predefined cross-sectional area.

Example A3. The mobile testing device of any one of Examples A1 and A2, further comprising a battery and battery circuitry that are configured to power a heating element for imitating the at least one characteristic of the predefined animal, the battery circuitry being configured to distribute power to the heating element for a duration of the testing.

Example A4. The mobile testing device of any one of Examples A1-A3, the processing circuitry is further configured to repeat the traversing of the at least a portion of the premises monitored by the premises security system while imitating the at least one characteristic of the predefined animal for a predefined number of times during the testing.

Example A5. The mobile testing device of any one of Examples A1-A4, further comprising at least one sensor configured to track a predefined path in the premises for testing.

Example A6. The mobile testing device of any one of Examples A1-A5, wherein the processing circuitry is further configured to indicate, to a control device of the premises security system, the predefined animal in order to allow the control device to reconfigure at least one premises device based on the testing.

Example B1. A control device for managing a plurality of premises devices in a premises security system, the control device comprising:

- processing circuitry configured to:
  - receive an indication of at least one of a predefined animal and at least one characteristic of a predefined animal that was imitated by a mobile testing device;
  - during testing of the premises security system, receive sensor data from at least one of the plurality of sensor devices, the sensor data indicating the at least one sensor was triggered; and
  - modify at least one setting of at least one of the plurality of premises devices based at least in part on the indication and the received sensor data.

Example B2. The control device of Example B2, wherein the at least one setting includes at least one of a sensor sensitivity and direction of sensing.

Example C1. A method implemented by a mobile testing device for testing at least one premises device in a premises security system, the method comprising:

- imitating at least one characteristic of a predefined animal; and
- traversing at least a portion of a premises monitored by the premises security system while imitating the at least one characteristic of the predefined animal.

Example C2. The method of Example C1, wherein the at least one characteristic include at least one of a predefined thermal profile, a predefined mobile speed, a predefined cross-sectional area, a predefined height, a predefined amount of heat generation, and a predefined thermal profile along the predefined cross-sectional area.

Example C3. The method of any one of Examples C1 and C2, further comprising:

- powering a heating element for imitating the at least one characteristic of the predefined animal; and
- distributing power to the heating element for a duration of the testing.

Example C4. The method of any one of Examples C1-C3, further comprising repeating the traversing of the at least a portion of the premises monitored by the premises security system while imitating the at least one characteristic of the predefined animal for a predefined number of times during the testing.

Example C5. The method of any one of Examples C1-C4, further comprising tracking a predefined path in the premises for testing.

Example C6. The method of any one of Examples C1-05, further comprising indicating, to a control device of the premises security system, the predefined animal in order to allow the control device to reconfigure at least one premises device based on the testing.

Example D1. A method implemented by a control device for managing a plurality of premises devices in a premises security system, the method comprising:

receiving an indication of at least one of a predefined animal and at least one characteristic of a predefined animal that was imitated by a mobile testing device;

during testing of the premises security system, receiving sensor data from at least one of the plurality of sensor devices, the sensor data indicating the at least one sensor was triggered; and modifying at least one setting of at least one of the plurality of premises devices based at least in part on the indication and the received sensor data.

Example D2. The method of Example D1, wherein the at least one setting includes at least one of a sensor sensitivity and direction of sensing.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed:

1. A mobile testing device for testing at least one premises device in a testing environment, the mobile testing device comprising processing circuitry configured to:

cause a mechanical change and a temperature change of the mobile testing device according to a stored animal profile, the stored animal profile corresponding to a predefined animal; and cause the mobile testing device to traverse at least one portion of the testing environment based at least in part on the stored animal profile for testing of the at least one premises device in the testing environment.

2. The mobile testing device of claim 1, wherein the processing circuitry is further configured to:

cause a change in at least one additional characteristic of the mobile testing device according to the stored animal profile, the at least one additional characteristic comprising at least one of:

a predefined linear acceleration profile;
a predefined linear minimum velocity;
a predefined linear maximum velocity;
a predefined rotational acceleration profile;
a predefined minimum rotational velocity;
a predefined maximum rotational velocity;
a predefined cross-sectional area;
a predefined height;
a predefined sound;
a predefined amount of heat generation; or
a predefined thermal profile along the predefined cross-sectional area.

3. The mobile testing device of claim 1, further comprising a battery and battery circuitry that are configured to power at least one heating element corresponding to a thermal profile of the predefined animal, the battery circuitry being configured to distribute power to the at least one heating element for a duration of the traversing.

4. The mobile testing device of claim 1, wherein the processing circuitry is further configured to:

deploy at least one expandable element to increase a cross-sectional area in a predefined manner, the cross-sectional area corresponding to the predefined animal.

5. The mobile testing device of claim 1, further comprising at least one sensor configured to track a predefined path in the testing environment to enable the mobile testing device to traverse a predefined path through at least part of the testing environment.

6. The mobile testing device of claim 1, further comprising at least one sensor configured to track a predefined path in the testing environment to enable the mobile testing device to recognize a non-predefined path when the mobile testing device deviates from the predefined path.

7. The mobile testing device of claim 1, wherein the processing circuitry is further configured to cause the device to traverse randomly through at least part of the testing environment.

8. The mobile testing device of claim 1, further comprising a preconfigured cap that is removably attachable to the mobile testing device, the cap being sized based at least in part on the predefined animal; and the preconfigured cap comprising a plurality of heating elements to generate a thermal profile of the predefined animal.

9. The mobile testing device of claim 1, wherein the processing circuitry is further configured to dynamically modify at least one characteristic of the mobile testing device according to the stored animal profile while testing the at least one premises device in the testing environment.

10. A method implemented by a mobile testing device for testing at least one premises device in a testing environment, the method comprising:

causing a mechanical change and a temperature change of the mobile testing device according to a stored animal profile, the stored animal profile corresponding to a predefined animal; and causing the mobile testing device to traverse at least one portion of the testing environment based at least in part on the stored animal profile for testing of the at least one premises device in the testing environment.

11. The method of claim 10, wherein the method further comprises:

causing a change in at least one additional characteristic of the mobile testing device according to the stored animal profile, the at least one additional characteristic comprising at least one of:

a predefined linear acceleration profile;
a predefined linear minimum velocity;
a predefined linear maximum velocity;
a predefined rotational acceleration profile;
a predefined minimum rotational velocity;
a predefined maximum rotational velocity;
a predefined cross-sectional area;
a predefined height;
a predefined sound;
a predefined amount of heat generation; or
a predefined thermal profile along the predefined cross-sectional area.

12. The method of claim 10, further comprising powering at least one heating element corresponding to a thermal profile of the predefined animal; and distributing power to the at least one heating element for a duration of the traversing.

13. The method of claim 10, further comprising deploying at least one expandable element to increase a cross-sectional area in a predefined manner, the cross-sectional area corresponding to the predefined animal.

14. The method of claim 10, further comprising tracking a predefined path in the testing environment to enable the mobile testing device to traverse a predefined path through at least part of the testing environment.

15. The method of claim 10, further comprising tracking a predefined path in the testing environment to enable the mobile testing device to recognize a non-predefined path when the mobile testing device deviates from the predefined path.

16. The method of claim 10, wherein traversing at least one portion of the testing environment comprises randomly traversing at least part of the testing environment.

17. The method of claim 10, further comprising generating a thermal profile of the predefined animal using a preconfigured cap that is removably attachable to the mobile testing device, the cap being sized based at least in part on the predefined animal, the cap comprising a plurality of heating elements.

18. The method of claim 10, further comprising dynamically modifying at least one characteristic of the mobile testing device according to the stored animal profile while testing the at least one premises device in the testing environment.

19. A non-transitory, computer-readable storage medium comprising instructions configured to cause a mobile testing device to:

cause a mechanical change and a temperature change of the mobile testing device according a stored animal profile, the stored animal profile corresponding to a predefined animal; and cause the mobile testing device to traverse at least one portion of a testing environment based at least in part on the stored animal profile for the testing of at least one premises device in the testing environment.

20. The non-transitory, computer-readable storage medium of claim 19, wherein the instructions are further configured to cause a change in at least one additional characteristic of the mobile testing device according to the stored animal profile, the at least one additional characteristic comprising at least one of:

a predefined linear acceleration profile;
a predefined linear minimum velocity;
a predefined linear maximum velocity;
a predefined rotational acceleration profile;
a predefined minimum rotational velocity;
a predefined maximum rotational velocity;
a predefined cross-sectional area;
a predefined height;
a predefined sound;
a predefined amount of heat generation; or
a predefined thermal profile along the predefined cross-sectional area.

* * * * *